United States Patent
Bobier (10) Patent No.: US 8,094,759 B2
(45) Date of Patent: *Jan. 10, 2012

(54) SYSTEM AND METHOD FOR BROADBAND PULSE DETECTION AMONG MULTIPLE INTERFERERS USING A DYNAMIC FILTER RECEIVER

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 955 days.

This patent is subject to a terminal disclaimer.

(21) Appl. No.: 12/075,239

(22) Filed: Mar. 10, 2008

(65) Prior Publication Data

US 2008/0226002 A1    Sep. 18, 2008

Related U.S. Application Data

(60) Provisional application No. 60/918,373, filed on Mar. 16, 2007.

(51) Int. Cl.
*H03D 1/06* (2006.01)

(52) U.S. Cl. ........ 375/346; 375/260; 375/285; 375/348; 375/340; 455/307; 455/296

(58) Field of Classification Search ............. 375/346, 375/350, 285, 260, 348; 455/307, 296
See application file for complete search history.

(56) References Cited

U.S. PATENT DOCUMENTS

| | | | | |
|---|---|---|---|---|
| 5,694,437 | A | * | 12/1997 | Yang et al. ............ 375/346 |
| 5,995,565 | A | * | 11/1999 | Tong et al. ............ 375/346 |
| 7,349,503 | B2 | * | 3/2008 | Husted et al. .......... 375/346 |
| 7,804,922 | B2 | * | 9/2010 | Shi et al. ............. 375/350 |
| 2001/0033583 | A1 | | 10/2001 | Rabenko et al. |
| 2004/0042387 | A1 | | 3/2004 | Geile |
| 2005/0201498 | A1 | * | 9/2005 | Nakai ............... 375/346 |
| 2008/0225999 | A1 | * | 9/2008 | Bobier .............. 375/346 |
| 2009/0285343 | A1 | * | 11/2009 | Kolze et al. .......... 375/346 |

* cited by examiner

*Primary Examiner* — Eva Puente
(74) *Attorney, Agent, or Firm* — Dennis L. Cook, Esq.

(57) ABSTRACT

A system and method to detect broadband pulses in the presence of multiple strong narrow band interferers is disclosed whereby a dynamic filtering method is used to detect and notch out the interfering signal by forming notch filters at the precise location of the narrow band interferers.

2 Claims, 8 Drawing Sheets

SYSTEM AND METHOD FOR BROADBAND PULSE DETECTION AMONG MULTIPLE INTERFERERS USING A DYNAMIC FILTER RECEIVER

CROSS-REFERENCE TO RELATED APPLICATION

The present application claims the benefit of previously filed co-pending Provisional Patent Application, Ser. No. 60/918,373 filed Mar. 16, 2007.

FIELD OF THE INVENTION

This invention addresses the need to transport high bit-rate data over wired or wireless means using specially modulated radio frequency carrier waves. Specifically, This disclosure describes a new method of detection of broadband pulses in the presence of multiple strong narrow band interferers.

BACKGROUND OF THE INVENTION

Modulation is the fundamental process in any communication system. It is a process to impress a message (voice, image, data, etc.) on to a carrier wave for transmission. A band-limited range of frequencies that comprise the message (baseband) is translated to a higher range of frequencies. The band-limited message is preserved, i.e., every frequency in that message is scaled by a constant value. The three key parameters of a carrier wave are its amplitude, its phase and its frequency, all of which can be modified in accordance with an information signal to obtain the modulated signal.

There are various shapes and forms of modulators. For example conventional Amplitude Modulation uses a number of different techniques for modulating the amplitude of the carrier in accordance with the information signal. These techniques have been described in detail in "Modern Analog and Digital Communication Systems" by B. P. Lathi. Similarly conventional Frequency/Phase Modulation uses a number of different methods described in a number of textbooks. In all these techniques, carrier (which is a high frequency sinusoidal signal) characteristics (either amplitude, frequency, phase or combination of these) are changed in accordance with the data (or information signal). Thus there have been two major components of a modulated signal used in communication systems. One is the information carrying signal and the other is the high frequency carrier.

Communication systems that have emerged in recent years include mono-pulse and Ultra-Wide Band communication systems. The problem with these systems is that all mono-pulse or Ultra-Wide Band communications systems form Power Spectrum Densities that tend to span very wide swaths of the radio spectrum. For instance the FCC has conditionally allowed limited power use of UWB from 3.2 GHz to 10 GHz. These systems must make use of very wide sections of radio spectrum because the transmit power in any narrow section of the spectrum is very low. Generally any 4 KHz section of the affected spectrum will contain no more than −42 dbm of UWB spectral power. Correlating receivers are used to "gather" such very wide spectral power and concentrate it into detectable pulses. Interfering signals are problematic. Since the communication system is receiving energy over a very wide spectrum, any interfering signal in that spectrum must be tolerated and mitigated within the receiver. Many schemes exist to mitigate the interference. Some of these include selective blocking of certain sections of spectrum so as not to hear the interferer, OFDM schemes that send redundant copies of the information in the hope that at least one copy will get through the interference, and other more exotic schemes that require sophisticated DSP algorithms to perform advanced filtering. In addition, UWB systems have somewhat of a "bad reputation" because they at least have the potential to cause interference. A heated discourse has gone on for years over the potential that UWB systems can cause interference to legacy spectrum users.

Tri-State Integer Cycle Modulation (TICM) and other Integer Cycle Modulation techniques, which have now become known by its commercial designation, xMax, were designed by the inventor of this application to help alleviate this massive and growing problem. Its signal characteristics are such that absolute minimal sideband energy is generated during modulation but that its power spectrum density is quite wide relative to the information rate applied. Also, a narrower section of the power spectrum output can be used to represent the same information. The technique of broadband pulse detection disclosed herein is primarily applicable to these types of integer cycle and pulse modulation systems.

BRIEF SUMMARY OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006, filed by the inventor of this disclosure and is now known by its commercial designation, xMax. Pulse modulation is used in many forms and generally consists of a pulse of radio energy that can be as simple as On-Off Keying (OOK) to more complex systems like Pulse Position Modulation (PPM) and even more advanced systems such as xMax. The present invention outlines an improved method of detection of broadband pulses in the presence of multiple strong narrow band interferers (NBI).

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

Figure 1:
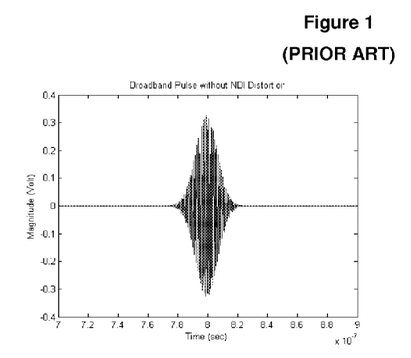
FIG. 1 is a representation of the power spectrum of a pulse without NBI distortion.
Figure 2:
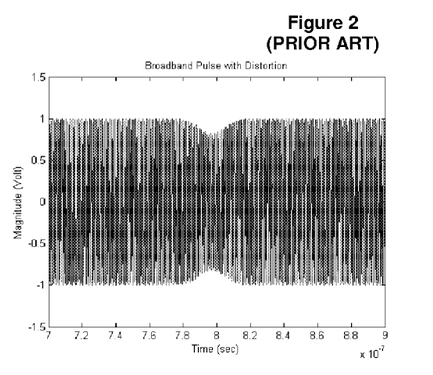
FIG. 2 is a representation of the power spectrum of a pulse with NBI distortion.

The radio spectrum can be considered one great radio channel. For usual purposes the radio spectrum is subdivided into smaller channels, such division being the prerogative of government regulators. Digital radio systems that are designed to deliver broadband data through such channels will use spectrum allocations set aside for such purposes. Such allocations might be specially allocated to licensed users and some radio spectrum is designated as unlicensed. In the Americas, one section of the band is designated as the 900 MHz ISM (Industrial, Scientific and Medical) band. During the 1990s most wireless data systems that were formerly using this band relocated to the 2.4 GHz band to avoid the crowding of users that had become problematic in the 900 MHz band. Such crowding now exists in the 2.4 GHz band as well as other unlicensed bands. However, a downside of moving to the higher frequency bands was the loss of range and penetration. Lower radio frequencies naturally penetrate through structures, foliage and other obstructions better than higher frequencies. Still the migration was not complete and many legacy, and some newer devices, still operate in the 900 MHz ISM band. One difficulty in using devices that transfer broadband information is that they will need large swaths of bandwidth, or in fact the entire designated band, in order to meet the minimal spectral requirements for the data payload to be moved. A typical broadband pulse without NBI interference is shown in FIG. 1. If one or more narrowband interferers are operating in the same channel, the broadband signal will incur difficulty due to signal distortion and generally interference. One system used to mitigate this problem is known as Narrow-Band Integer Cycle or Impulse Modulation Spectrum Sharing Method filed Feb. 24, 2006 U.S. application Ser. No. 11/361,397 by the inventor of this disclosure, now U.S. Pat. No. 7,486,715. But if the narrow band interferers (NBI) are strong enough, the broadband signal might become so distorted that message recovery becomes impossible as shown in FIG. 2.

This problem becomes especially pronounced when high order modulation schemes such as Quadrature Amplitude Modulation (QAM) are used to form the broadband message. In fact the higher the order of modulation that is used (QAM16, QAM32, etc), the more pronounced the problem becomes. This is why systems that use QAM and the like will reduce the order or complexity in response to noise and NBI to maintain the data link and reduce errors. Systems that use single cycle modulation, discussed in various patents by Bobier and Khan, namely U.S. Pat. Nos.: 6,901,246; 6,968, 014; and, 7,003,047, do not depend upon slight variations in phase, frequency and amplitude, but rather rely upon the formation of a homogenous burst of spectral energy in response to the transmission of either single RF cycles of radio energy or very brief pulses of energy which are constrained to a limited radio band. Thus such systems correlate the transmission of a single bit of information to the transmission of the briefest possible burst over the homogenous radio spectrum power possible. Such systems, not being based upon complex variations of phase, frequency or amplitude, tend to be more resistant to noise and interferers. This can be thought of as a natural result since the now broad category of single cycle transmissions can be recognized as first order or base order modulation schemes. Never the less, even first order systems are subject to interference, as all radio systems are. The present invention defines an improved radio reception system that further improves the single cycle modulation (SCM) radio receivers' immunity to NBI.

Figure 3:
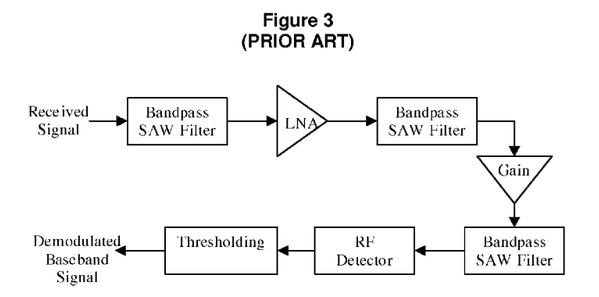
FIG. 3 is a representation of a simple direct conversion integer cycle modulation receiver.

At present, radio receivers used in the reception of SCM take various forms, some being more or less resistant to NBI. The simplest, a direct conversion receiver shown in FIG. 3, receives the radio band in which the transmission takes place, filters out the external bands through band pass filters, amplifies the band to a level suitable for detection, and depends upon the detection of the time domain representation of the original transmitted pulse though use of a comparator threshold circuit. The pulse threshold is compared to a reference level and pulses that exceed the reference threshold are considered as valid "1" bits. Since the coding scheme used transmits bits in a specific time frame and schedule, the presence of a pulse will represent a "1" and the lack of a pulse will represent a "0". It's an efficient scheme and allows radio signals that have a remarkably low nominal power to attain a long range because while average power can be quite low, the very brief duration and relatively long silent period between pulses allow the pulse itself to be transmitted at relatively high power. Thus signal to noise ratio during the moment of transmission can actually be quite high at the receiver. Despite the high instantaneous power at the brief moment of transmission, the radio spectrum is little affected and interference to traditional users of the spectrum is quite low. Thus SCM is a good neighbor in terms of spectrum sharing. However, this system is subject to NBI because the time domain pulse at the SCM receiver will become distorted as NBI increases and simple threshold detection can become quite unreliable in the presence of even a single strong NBI.

Figure 4:
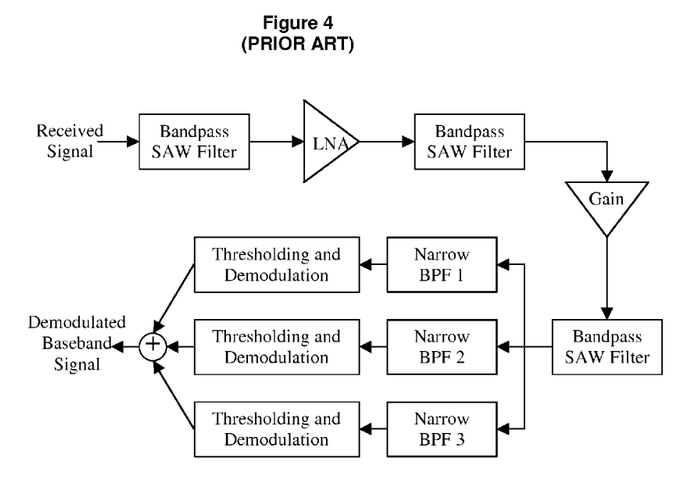
FIG. 4 is a representation of an integer cycle modulation rake receiver.

Thus a second type of receiver has been designed to improve immunity to NBI. Based upon the well-known Rake Receiver, the second-generation receiver divides the band into multiple sub bands as shown in FIG. 4. Individual detectors at each sub band detect the SCM pulse, and the output of each sub band detector is ANDed to indicate the presence of the wide band signal. A strong interferer might keep an individual sub band detection circuit in a continuous SIGNAL DETECTED mode, but only a simultaneous SIGNAL DETECTED output from all sub band detectors would constitute a valid pulse detection.

This system, does increase the Signal to Interference Ratio (SIR) substantially. The amount of improvement depends upon the number of "fingers" involved in the subdivision process. Thus we have improved performance while increasing complexity of the circuitry. Certainly some circuit complexity can be reduced by moving the sub banding and detection to a digital signal processor (DSP), but the computing power of the DSP must be large enough to process enough sub bands to make the endeavor worth while. This increase of complexity, whether by discrete circuitry or DSP power contributes substantially to the cost of the receiver.

Figure 5:
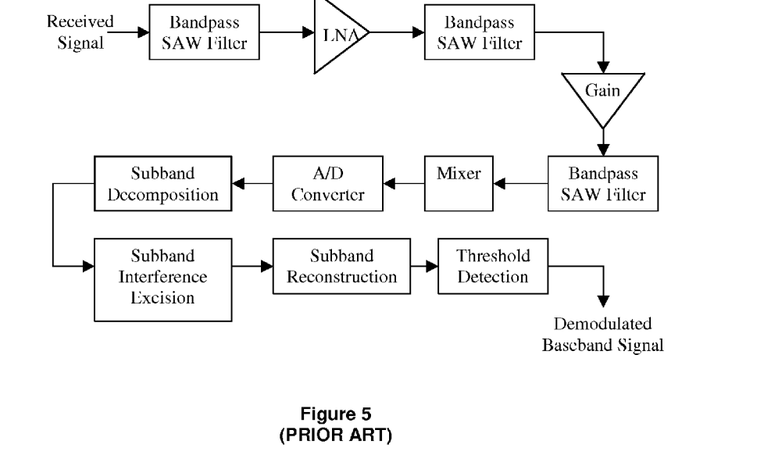
FIG. 5 is a representation of an integer cycle modulation DSP based sub-band receiver.

As shown in FIG. 5 a third improvement to the reception of SCM signals was made when a mixer is added to the receiver to down convert the 900 MHz signal to an IF frequency. At this point an A/D converter digitizes the signal. Again sub bands are formed using FIR filters. Now each sub band is analyzed by the DSP and any sub bands found to contain NBI are discarded. The surviving sub bands are then re-combined and a pulse can be detected in the time domain by the familiar threshold detector.

Figure 6:
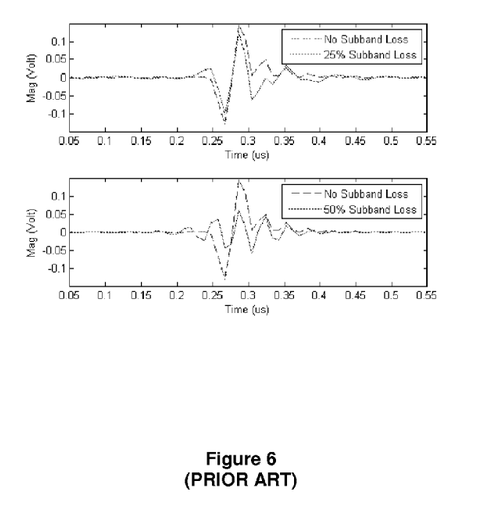
FIG. 6 is a representation of a four sub-band receiver output with 25% and 50% sub-band based loss due to NBI.

Alternatively a correlator can be used to compare the reconstituted pulse to a stored pattern of ideal and non-ideal pulses to form a logical decision of PULSE DETECTED or NOT PULSE DETECTED. This system does in fact further improve the receivers' susceptibility to NBI. Using a moderately priced FPGA to perform the DSP function yields an SIR level of about −10 to −20 db. That is to say that the interferer can be as high as 20 db stronger than the SCM signal and still yield a good result. However even this system has limitations. The number of sub bands will determine the SIR performance. More sub bands will eliminate more interferers while limiting the damage to the broadband pulse, but at the added expense of DSP size and cost. In consumer priced products, the current state of the art in FPGA design limits the design to about four sub bands. Thus the loss of a single sub band to a single NBI will destroy 25% of the wide band signal. Two NBI signals, each affecting different sub bands will eliminate 50% of the broadband signal and seriously detract from the SIR performance of the receiver as shown in the represented outputs displayed on FIG. 6. A further improvement is needed.

Figure 7:
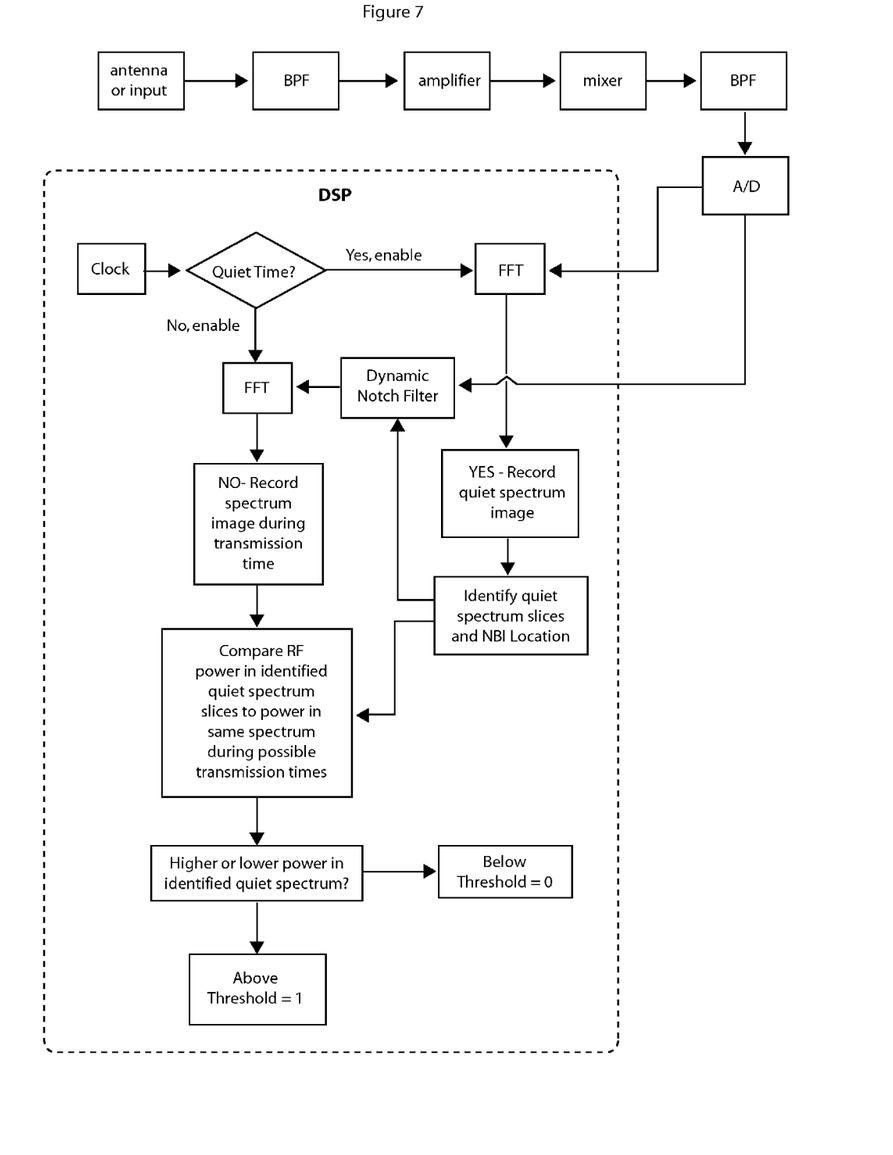
FIG. 7 is a representation of a DSP based integer cycle modulation receiver block diagram.

The present invention, described herein, will define a new receiver paradigm that draws less on the DSP power, yet increases the number of NBI signals that can be tolerated and will increase the SIR level dramatically, thus decreasing cost and complexity while improving performance. A block diagram of such a receiver called a Dynamic Filter Receiver is shown in FIG. 7.

In the Dynamic Filter Receiver the receiver is again sensitive to the broadband radio channel. The channel is received, amplified, band pass filtered and converted to an IF frequency. Once the signal is converted, the IF is again band pass filtered to recover only the desired channel and then digitized via an A/D converter.

Figure 8:
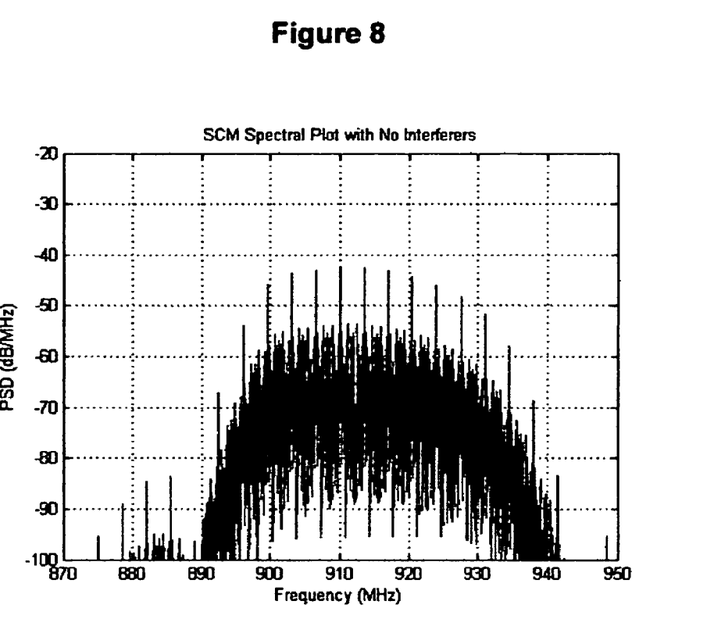
FIG. 8 is a representation of an integer cycle modulation spectral plot with no interferers.

As discussed above one of the core tenets of SCM is that pulses are either transmitted or not transmitted, according to the binary logic state of "1" or "0" at a specified time in a pre-arranged time schedule or "frame". A spectral plot of an SCM pulse is shown in FIG. 8. Thus the receiver need not continuously sample the radio spectrum, but only needs to sample the spectrum during a short and pre-arranged time slot. Thus a "snapshot" of the radio band can be taken when we expect a transmission from the transmitter.

Figure 9:
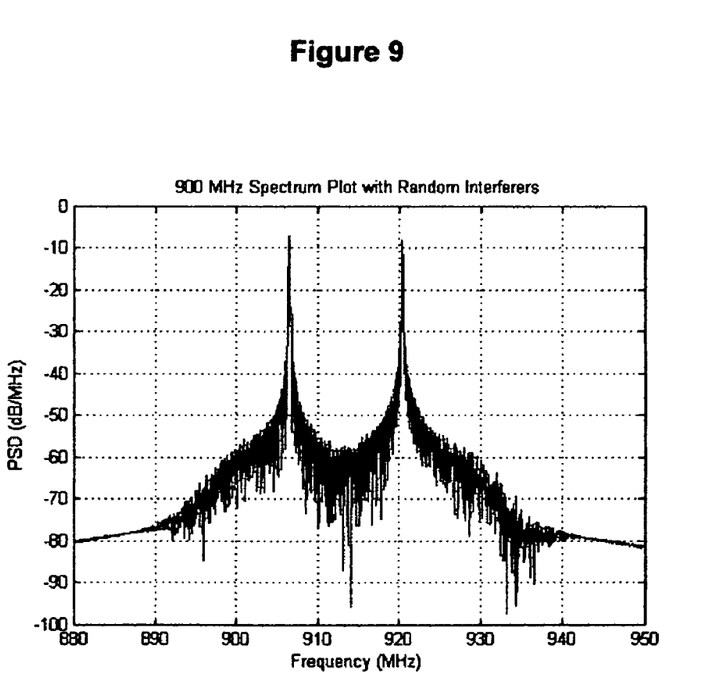
FIG. 9 is a representation of a 900 MHz spectral plot with random interferers.

Thus since we know when the transmitter could be sending a transmission, we also know when the transmitter will not be sending a transmission. This is referred to as a "quiet time". In order to get a snapshot of the radio spectrum when we are certain that there will not be an SCM transmission, we simply refer to the transmission frame schedule and perform the digitization of a sample of the radio channel at the scheduled quiet time. At the appointed time, we sample the spectrum and perform an FFT (Fast Fourier Transform). Simple DSP analysis of the spectrum allows us to see where NBI is as strong as or stronger than the ambient noise floor. Thus we know exactly where there is NBI and where there is not. Now we have a reference picture of the radio channel condition as shown in FIG. 9. This reference snapshot will be replaced regularly; at least once per data frame, so a radio channel that is changing over time will also change the reference picture.

Figure 10:
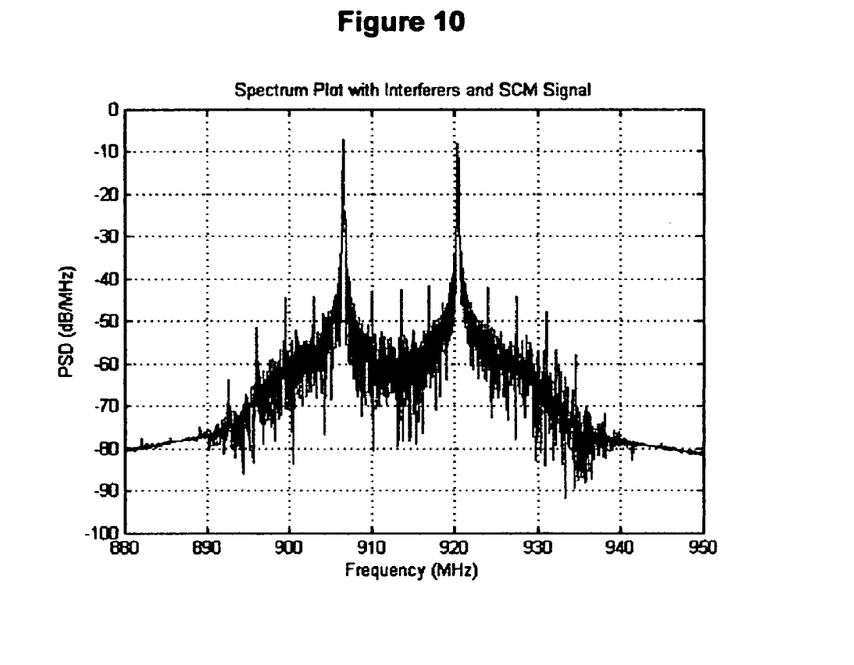
FIG. 10 is a representation of a spectral plot with reference interferers and integer cycle modulation signal present.
Figure 11:
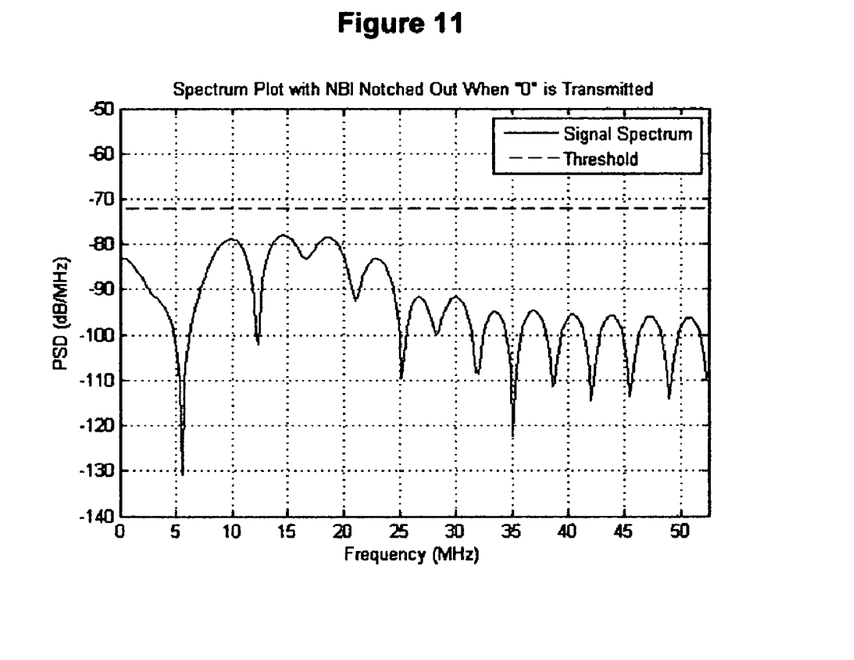
FIG. 11 is a representation of a spectral plot with NBI notched out with integer cycle modulation pulse=0; and, FIG. 12 is a representation of a spectral plot with NBI notched out with integer cycle modulation pulse=1.
Figure 12:
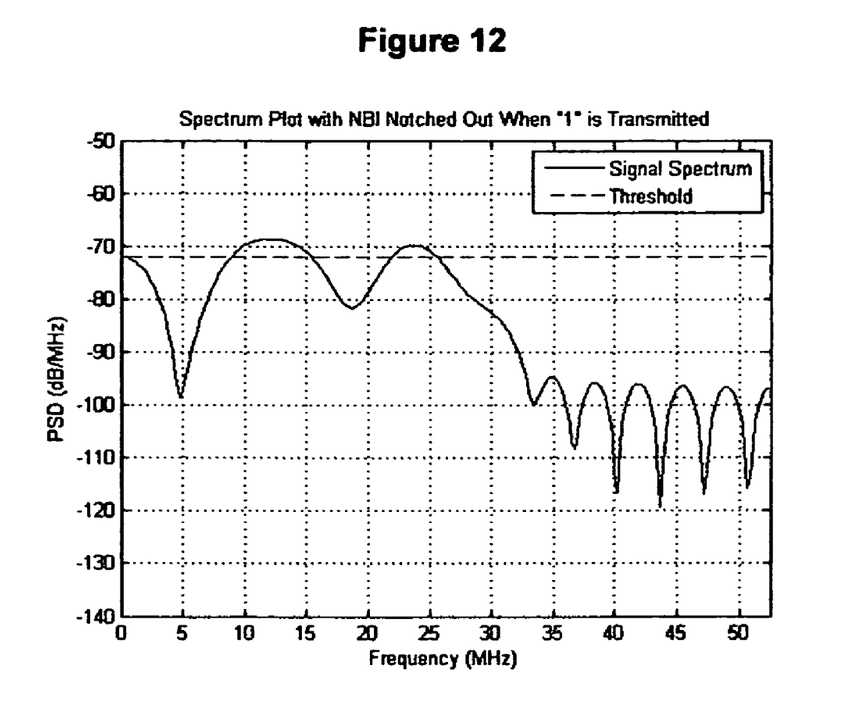

When it is the appointed time for an SCM pulse to be transmitted and received a brief snapshot is again taken, but this time the digitization and FFT are processed when there could be an SCM pulse present in the radio channel as shown in FIG. 10. The DSP must decide whether there is an SCM pulse present or not. This is done by analysis of the spectrum via the "quiet time" FFT which was previously performed by the DSP. The NBI is located and the DSP will respond by forming finite impulse response (FIR) notch filters at the precise locations of the NBI signals. Thus, the signal is now devoid of NBI. Now, at the appointed symbol period, a second FFT is taken. Having removed the NBI through use of the notch filters, the band contains only SCM energy. Since the location of the notch filters is known, the band power can be sampled at a band location or frequency that is known to contain only SCM power. If the power level in the spectrum is higher than the power in the same unfiltered frequency or frequencies in the reference FFT, the symbol is considered to be a "1" as shown in FIG. 12. Otherwise the symbol is considered a "0" as shown in FIG. 11. Thus, nearly any number of NBI sources might exist in the channel, but they are narrow band in nature.

Thus, to determine the presence of a pulse, one needs only to look at a location in the spectrum where a narrowband interferer is known not to exist and compare the spectral power to the known spectral power during the quiet time in the reference sample. If the power is more (subject to an arbitrary threshold) the result is a "1". If it is not more, then the result is a "0".

The result of such signal analysis will be:
Nearly perfect immunity to NBI, even multitudinous co-existing NBI.
The power level of the NBI has nearly no effect on the analysis results.
Circuit complexity is not affected, regardless of the number of NBI signals one intends to be able to contend with.
Cost is held constant regardless of the number of NBI signals one intends to contend with.
Since the strength of the NBI signal has little or no effect upon the ability to recognize the SCM signal, The Signal to Interference Ratio becomes nearly infinite. Thus SCM signals become much more robust, range will increase dramatically and reliability is truly enhanced, even in a radio channel rich with NBI.

Since certain changes may be made in the above described integer cycle modulation dynamic filter receiver system and method without departing from the scope of the invention herein involved, it is intended that all matter contained in the description thereof or shown in the accompanying figures shall be interpreted as illustrative and not in a limiting sense.

What is claimed is:
1. A method for receiving and demodulating an integer cycle or impulse modulated signal in a broadband radio channel that has been transmitted according to a transmission frame schedule known by a receiver where the transmission frame includes a transmission timeslot and a quiet timeslot where the presence of a pulse in the transmission timeslot signifies a one and absence of a pulse signifies a zero and where the broadband radio channel has narrow band interferer signals comprising:
    detecting radio frequency signals in the broadband radio channel;
    amplifying said radio frequency signals;
    band pass filtering said radio frequency signals;
    converting said radio frequency signals to an intermediate frequency;
    band pass filtering said intermediate frequency;
    digitizing the filtered intermediate frequency;
    sampling the digitized filtered intermediate frequency during a quiet timeslot then performing a fast Fourier transform on quiet timeslot sample and then recording quiet timeslot spectrum samples;
    analyzing the quiet timeslot spectrum samples and determining which locations in the broadband radio channel the power of the narrow band interferer signals are as strong or stronger than the power of ambient noise in the broadband radio channel;

creating one or more notch filters at the locations of the narrow band interferer signals and removing said narrow band interfering signals from the digitized filtered intermediate frequency;

sampling the notch filtered digitized filtered intermediate frequency during a transmission timeslot then performing a fast Fourier transform on transmission timeslot sample and then recording transmit timeslot spectrum samples; and, comparing the power of the notch filtered transmit timeslot sample to the power of said quiet timeslot sample and if the power of said notch filtered transmit timeslot sample is stronger than the power of said quiet timeslot sample by an amount over a set threshold a pulse is present signifying a one and if the power of said notch filtered transmit timeslot sample is not stronger than the power of said quiet timeslot sample by an amount over a set threshold a pulse is absent signifying a zero.

2. The method for receiving and demodulating an integer cycle or impulse modulated signal of claim 1 wherein one or more finite impulse response notch filters are created at the locations of the narrow band interferer signals to remove said narrow band interfering signals from the digitized filtered intermediate frequency.

* * * * *